United States Patent [19]

Gillett

[11] 4,181,470
[45] Jan. 1, 1980

[54] GAS-OPERATED LIQUID PUMP

[76] Inventor: Bruce F. Gillett, Rte. 1, Box 44, Marine-on-St. Croix, Minn. 55047

[21] Appl. No.: 852,935

[22] Filed: Nov. 18, 1977

[51] Int. Cl.² .................................................. F04F 1/06
[52] U.S. Cl. .................................... 417/131; 417/136; 417/138; 417/140
[58] Field of Search .............. 417/126, 134, 135, 136, 417/118, 140, 138, 130, 131, 132

[56] References Cited

U.S. PATENT DOCUMENTS

| | | | |
|---|---|---|---|
| 600,425 | 3/1898 | Johnson | 417/126 |
| 775,443 | 11/1904 | Carpenter | 417/134 |
| 1,377,277 | 5/1921 | Risinger | 417/140 X |
| 3,408,949 | 11/1968 | Hart | 417/126 |

FOREIGN PATENT DOCUMENTS 355717 8/1931 United Kingdom ...................... 417/134

*Primary Examiner*—Richard E. Gluck
*Attorney, Agent, or Firm*—James R. Haller; Steven G. Parmelee

[57] ABSTRACT

A gas-operated liquid pump which includes an outer, stationary compartment and an inner compartment movable between upper and lower positions in the outer compartment. The inner compartment has positive buoyancy in the liquid to be pumped. Valve means operated by movement of the inner container is provided to cause gas admitted to the inner container to displace liquid therefrom when the inner container is in its upper position, and to permit gas to escape from the inner compartment when the latter is in its lower position. The pump makes use of a continuous stream of compressed gas such as air to provide a pulsating flow of liquid. The pump is useful in aquariums to create water movement or to pump water to a filter.

7 Claims, 4 Drawing Figures

GAS-OPERATED LIQUID PUMP

BACKGROUND OF THE INVENTION

It is often desirable to employ a gas, such as air, under pressure to drive a liquid pump. Certain prior art pumps of this type have been specifically designed to meter fluids in industrial chemical operations; others have been proposed for uses such as pumping water from wells, etc. Such pumps may employ compressed air or other gas to drive a motor which, in turn, drives a liquid pump, or such pumps may operate on the basis of liquid displacement in which a gas is forced into a vessel to displace liquid therefrom. Devices of the latter type are shown in U.S. Pat. Nos. 274,103; 726,359; 745,529 and 745,626. The devices of each of these patents employ rather detailed and complicated mechanical devices to accomplish the necessary so that the vessels can alternately be filled and emptied. In the last three patents mentioned above, use is made of sealed floats which rise and fall within a pressure vessel in accordance with changes of liquid level. The sealed floats occupy a significant portion of the volume of the pressure vessels, and are provided with levers or pins or the like to operate mechanical valves. Pressures developed across the float walls may be significant.

It would be highly desirable to provide a gas-operated liquid pump wherein substantially the entire internal volume of the pump is available for liquid occupancy and flow, and which would avoid the use of complicated mechanical valving apparatuses.

SUMMARY OF THE INVENTION

The invention relates to a gas-operated liquid pump which is deceptively simple in structure, which avoids the necessity of complicated mechanical valving and which has an interior substantially completely available for fluid occupancy and flow. The pump of my invention operates with minimal friction.

The pump comprises means defining an outer compartment, and means defining an inner compartment freely movable between upper and lower positions in the outer compartment. The inner compartment has a positive buoyancy in the liquid to be pumped; that is, when the inner compartment is immersed in the liquid, buoyant forces exerted upwardly on the inner compartment are greater than gravitational forces acting on the inner compartment. Means are provided for introducing gas under pressure, and also a liquid, into the inner compartment, and means are also provided for receiving liquid from the inner compartment.

The pump includes valve means operable, when the inner compartment is in its upper position, to cause gas admitted to the inner container to displace liquid therefrom to thereby pump the liquid. The valve means also permits gas to escape from the inner compartment when the latter is in its lower position. The valve means desirably includes a gas escape port in an upper portion of the inner compartment, and seal means for closing or sealing the latter port when the inner compartment is in its upper position. The seal means preferably includes a seal disposed exteriorly of the inner compartment adjacent the gas escape port, and adapted to be contacted by and sealed with a confronting portion of the outer compartment.

The inner and outer compartments desirably have confronting, spaced side walls defining between them a space available for liquid occupancy and flow. Liquid in the space serves to buoy the inner compartment upwardly into its upper position, and further serves as a lubricant between the compartments to minimize friction therebetween. The space desirably communicates with the interior of the inner compartment to permit liquid in the space to be displaced with gas, thereby reducing the buoyancy of the inner compartment and permitting the latter to fall to its lower position.

Since little, if any, pressure differential is developed across the walls of the inner compartment, such walls may be made of thin material which occupies a negligable volume. Hence, substantially the entire internal volume of the outer compartment is available for liquid occupancy and flow.

The pump of my invention provides a pulsating liquid flow, and is useful for metering liquids in industry. The pump is particularly useful as a pump for aquariums, the water thus pumped being conveyed to a filter or being employed to maintain the water in an aquarium in continuous motion.

DESCRIPTION OF THE PREFERRED EMBODIMENT

Figure 1:
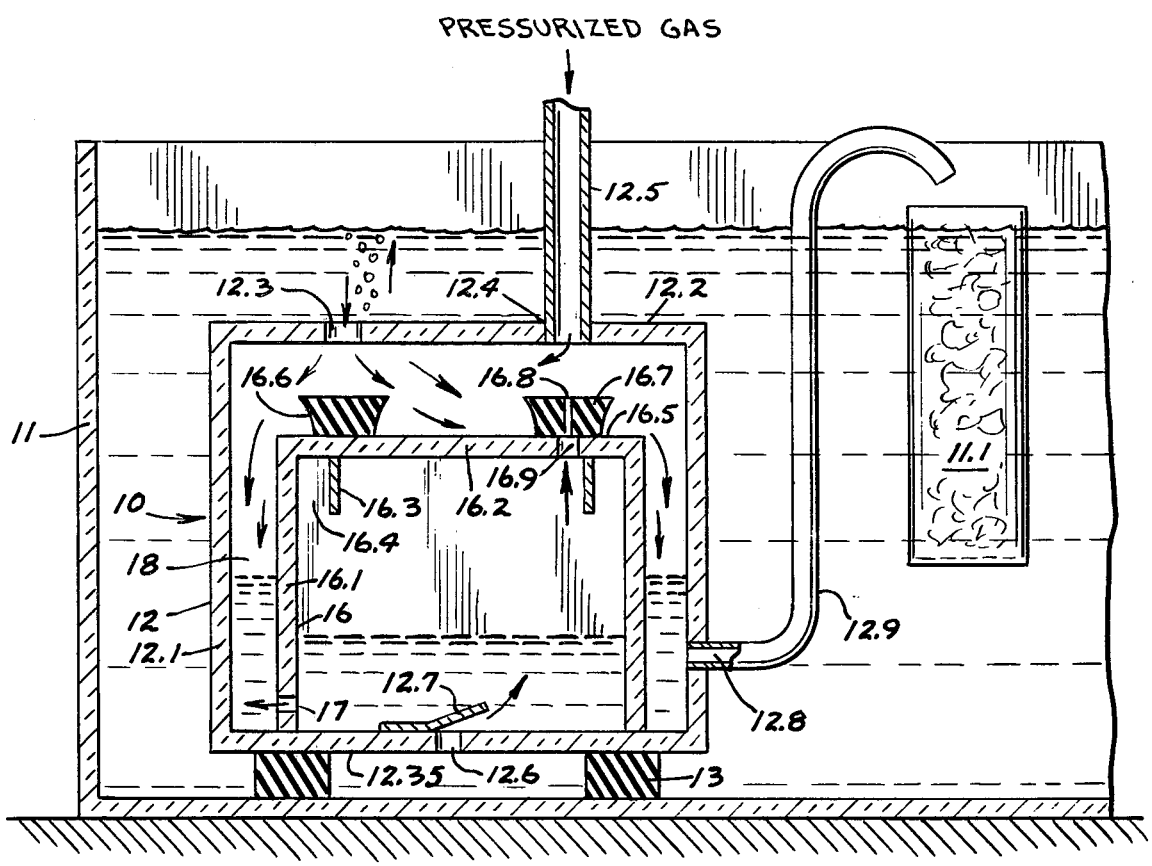
FIG. 1 is a largely diagrammatic, cross-sectional view of a pump of the invention as the same may be used in an aquarium, the inner compartment being shown in its lower position.
Figure 2:
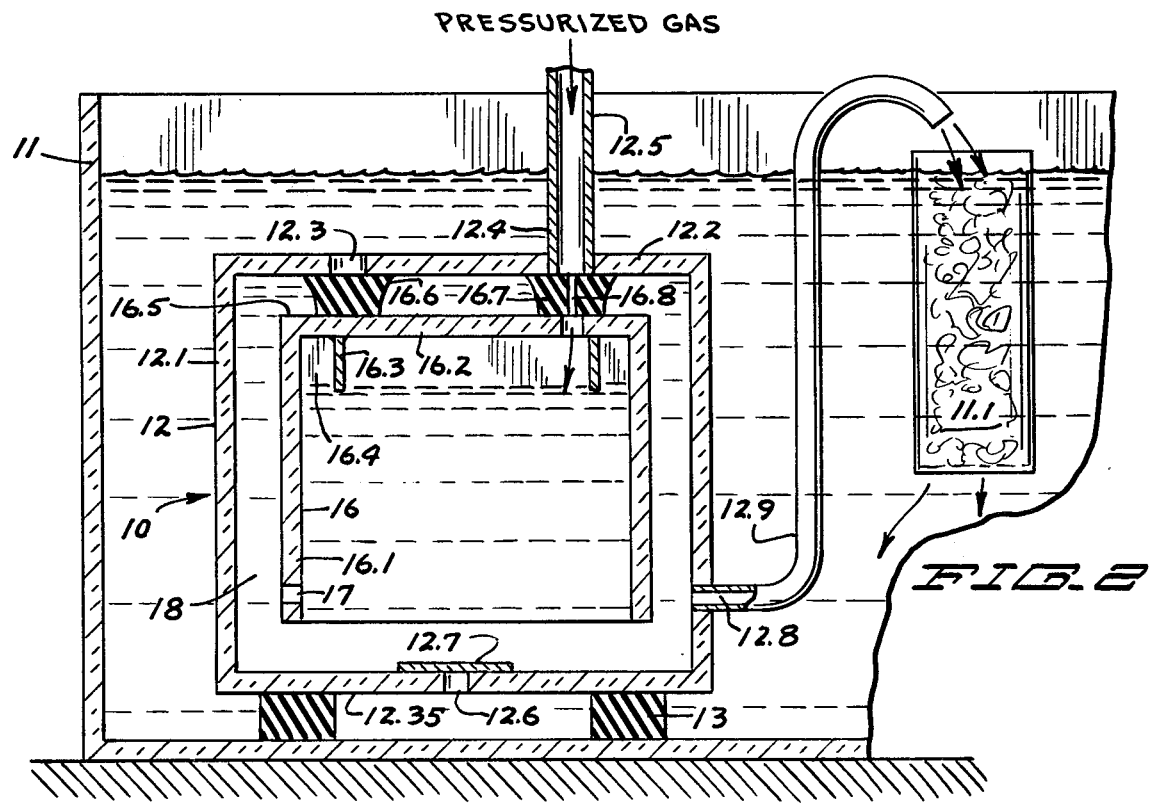
FIG. 2 is a view similar to that of FIG. 1 but showing the inner compartment in its upper position.

Referring first to FIGS. 1 and 2, a pump of the invention is designated generally as 10 and is shown in position in a container of liquid, which for purposes of example may be considered to be an aquarium filled with water. The pump of FIGS. 1 and 2 has an outer compartment 12 having side walls 12.1, a top wall 12.2, and a bottom wall 12.3. As shown, the compartment 12 is generally parallelepiped in shape, and is nearly cubical. The top wall 12.2 of the outer compartment is provided with a gas escape port 12.3 and a gas inlet port 12.4, the latter being connected through tube 12.5 to a source of gas under pressure. The bottom wall 12.3 of the outer compartment is provided with a liquid inlet port 12.6 through which liquid may enter the outer compartment. A flap 12.7 of rubber or other resilient material is mounted to the inner surface of the bottom wall 12.35 in a manner permitting the flap to open and close upon the port 12.6, the flap and port thus serving as a check valve permitting liquid to flow only inwardly of the outer compartment 12 through the port 12.6. The outer compartment is also provided with a liquid outlet port 12.8 near its lower edge, and a tube 12.9 serves to convey liquid outwardly from the liquid outlet port.

An inner compartment 16 is positioned within the outer compartment and is provided with side and top walls 16.1, 16.2, respectively, and an open bottom. The inner compartment is generally parallelepiped in shape, as shown, and its walls may be quite thin. The side walls 16.1 of the inner compartment are spaced inwardly from the side walls 12.1 of the outer compartment to provide a space 18 therebetween, the space permitting the inner compartment to freely move upwardly and downwardly within the outer compartment. The height of the inner compartment is somewhat less than that of the outer compartment so that some vertical movement of the inner compartment can occur. The top wall 16.2 of the inner compartment is provided with short, downwardly extending flanges 16.3 adjacent its edges, the flanges cooperating with the top and side walls to define a gas space 16.4 (FIG. 2) which lends positive buoyancy to the inner compartment.

As thus described, it will be understood that the inner compartment can move upwardly and downwardly within the outer compartment, with the confronting side walls of the compartments coacting only sufficiently to maintain the general orientation of the inner compartment within the outer compartment.

Mounted to the upper surface 16.5 of the inner compartment are resilient plugs 16.6, 16.7. The plug 16.6 has a flat, upper surface and is positioned in alignment with the gas escape port 12.3 so as to seal against the inner surface of the top wall 12.2 and hence block this port when the inner compartment is in its upper or raised position as shown in FIG. 2. The plug 16.7 similarly has a generally flat upper surface and is provided with a central bore 16.8 communicating with a gas inlet port 16.9 in the top wall of the inner compartment, the bore serving to communicate the gas inlet port 12.4 of the outer container with the interior of the inner container when the latter is in its upper position.

The operation of the pump of FIGS. 1 and 2 can perhaps most easily be described in the context of its use in an aquarium, such as that depicted at 11. The outer compartment is provided with weighted feet 13 which suitably anchor the outer compartment in a submersed position within the aquarium. The liquid outlet tube 12.9 may be oriented as shown to empty into an aquarium filter 11.1 to filter debris from the aquarium water. The gas inlet tube 12.5 is connected to a source of gas under pressure, e.g., a small air pump. For purposes of discussion, it may be assumed that the pump has just been submerged in the aquarium tank.

Water from within the aquarium enters the inner compartment through the liquid inlet port 12.6, the water pressure at the exterior of the pump exceeding the pressure within the pump. Pressurized air continuously enters the outer compartment through the port 12.4, and escapes thence outwardly through the gas escape port 12.3. The water level within the inner compartment rises, as does the water level in the space 18 between the inner and outer compartments, the latter space being filled by water entering through the gas escape port 12.3 or through a small port 17 near the bottom edge of the inner compartment, the displaced air escaping through the gas escape port 12.3. As the water level rises, air becomes trapped within the spaces 16.4 at the top of the inner compartment. As the buoyant forces acting on the inner compartment exceed the force of gravity acting on that compartment, the compartment rises, e.g., floats, to its upper position as shown in FIG. 2. The plug 16.6 closes the air escape port 12.3, and the bore 16.8 of the plug 16.7 provides a conduit to convey air under pressure from the tube 12.5 into the interior of the inner compartment. The air pressure entering the inner compartment displaces the water therefrom, and the water is hence pumped outwardly and through the tube 12.9. As the water level falls within the inner compartment, that compartment, of course, becomes more buoyant to seal the plugs 16.6, 16.7 more securely about the ports 12.3, 12.4. As the water level approaches or reaches the bottom edges of the inner compartment, air bubbles escape around those edges and rise into the space 18 between the compartments to displace water therefrom. As the water level in the space 18 falls, the buoyant forces acting on the inner compartment are decreased until the inner compartment drops of its own weight into its lower position on the bottom wall 12.3 of the outer compartment, thereby unplugging the ports 12.3 and 12.4. During the thus described pumping cycle, it will be understood that the check valve flap 12.7 is seated tightly against the liquid inlet port 12.6.

With the inner compartment again in its lower position (FIG. 1), water again enters through the liquid inlet port 12.6 to fill the inner compartment and the space 18, and the cycle is repeated.

From the above description, it will be seen that little, if any, pressure drop occurs across the walls of the inner compartment, since during the pumping cycle the inner compartment and the space 18 are in full communication with one another at the bottom edges of the inner compartment. The walls of the inner compartment hence may be made of thin material, and as a result substantially the entire volume of the outer compartment is available for fluid occupancy and flow.

Figure 3:
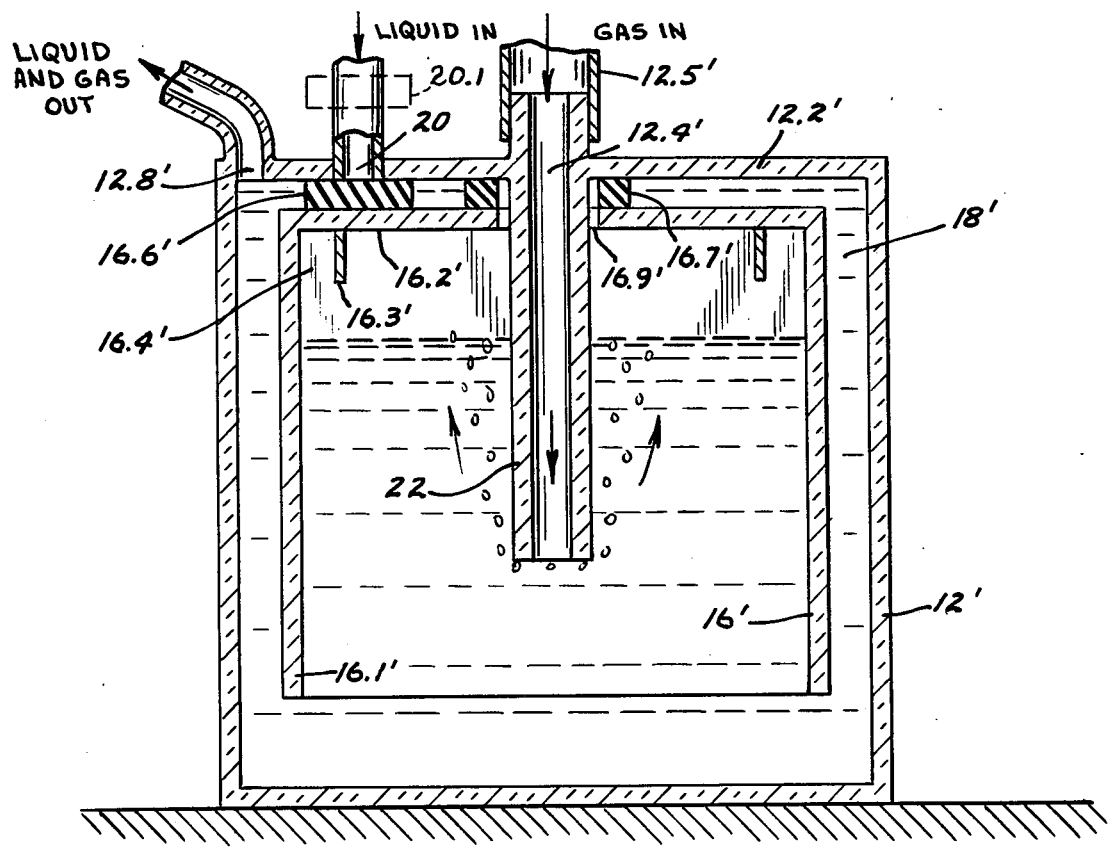
FIG. 3 is an alternate embodiment of the pump of the invention, shown in largely diagrammatic cross-sectional form.

A modified pump of the invention is shown in FIG. 3, and similarly employs outer and inner compartments 12' and 16'. As shown, this pump is not submerged in a tank of liquid, but rather liquid is conveyed, e.g., by gravity flow, to a port 20 in the upper wall 12.2' of the outer compartment. The outer compartment is similarly provided with a liquid outlet port 12.8', and a gas inlet port 12.4' in its upper wall attached to a pressurized gas supply tube 12.5'. The gas inlet port 12.4 includes a gas pipe 22 which descends downwardly through an opening or port 16.9' formed in the upper wall 16.2' of the inner compartment. The upper wall of the inner compartment is provided exteriorly with a plug 16.6' which, when the inner compartment is in its upper position as shown in FIG. 3, blocks or plugs the liquid inlet port 20. The upper surface of the inner compartment is also provided exteriorly with an annular plug or washer 16.7', the latter plug being positioned about the periphery of the port 16.9' and abutting and sealing against the confronting surface of the top wall 12.2' of the outer compartment when the inner compartment is in its upper position, thereby preventing air entering through the gas supply tube 12.5' from escaping into the space 18' between the walls of the compartments. The inner compartment is similarly provided with flanges 12.3' defining, with the walls of the inner compartment, a trapped gas space 16.4' to render the inner compartment buoyant in the liquid to be pumped.

Figure 4:
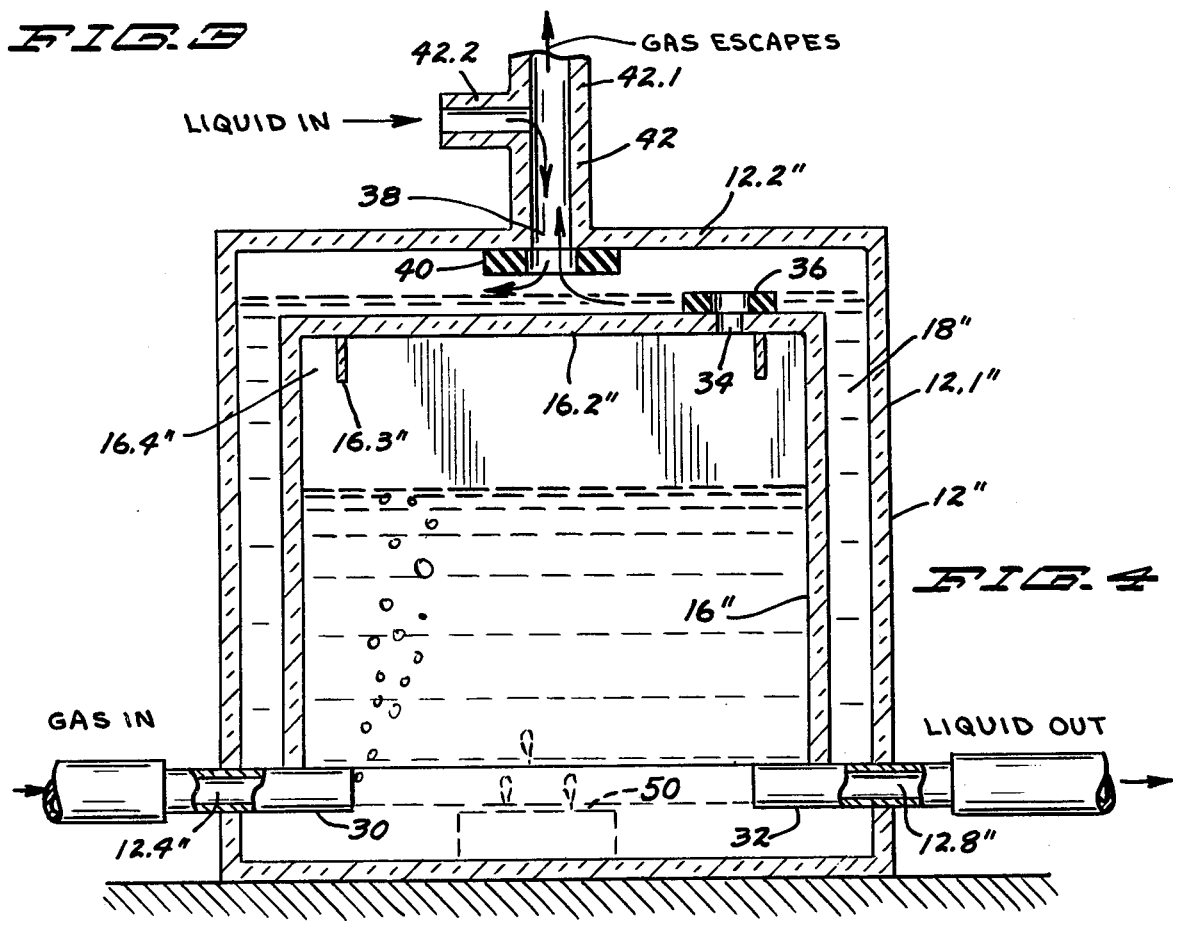
FIG. 4 is a largely diagrammatic, cross-sectional view of yet another embodiment of the invention.

In operation, with the inner compartment initially in its lower position and the plugs 16.6', 16.7' being spaced below the ports 20, 12.4', liquid enters the inner and outer compartments through the port 20. The pressurized gas entering through the port 12.4' escapes through the port 16.9' and thence through the liquid outlet port 12.8'. Liquid enters the inner compartment similarly through the port 16.9', although it is contemplated that the lower edge of the side walls 16.1' of the inner compartment may have one or more small ports therein to facilitate liquid flow between the space 18' and the interior of the inner compartment. As the liquid levels within the inner compartment and the space 18 rise, gas is trapped in the spaces 16.4 and the inner compartment is floated to its upper position as depicted in FIG. 3. The plug 16.6' blocks the liquid inlet port 20, and the annular plug 16.7' comes into contact with the confronting wall of the outer compartment to prevent air from escaping outwardly through the port 16.9'. It will be understood that during movement of the inner compartment between its upper and lower positions, the inner compartment is guided to some extent by the gas pipe 22. As gas continues to flow through the pipe 22, liquid is displaced from the inner compartment, increasing the buoyancy thereof and improving the seals provided by the plugs 16.6', 16.7'. The displaced liquid is hence forced or pumped outwardly through the liquid outlet port 12.8'. As the liquid level falls to the bottom edges of the walls 16.1' of the inner compartment, gas escapes into the space 18' whereupon the liquid level in that space drops also, thus reducing the buoyant forces on the inner compartment and permitting the latter to drop of its own weight into its lower position; the process is then repeated. If desired, the plug 16.6' may be omitted in favor of a check valve (shown in phantom lines as 20.1 in FIG. 3) permitting liquid to flow over into the pump. This embodiment has the advantage of employing but a single plug (e.g., 16.7'), thus avoiding any requirement that the confronting top surfaces of the compartments be precisely parallel A preferred embodiment of the pump of the invention is shown in FIG. 4, which similarly employs outer and inner compartments 12", 16". A gas inlet port 12.4" and a liquid outlet port 12.8" are provided in the side walls 12.1" of the outer compartment, and the gas inlet port is provided with a gas pipe 30 which extends beneath the open bottom of the inner compartment. The liquid outlet port may also be provided with a tubular extension 32 extending beneath the open bottom of the inner compartment, and other means, such as brackets or the like (not shown) may be employed if desired to support the weight of the inner compartment when the latter is in its lower position as shown in FIG. 4. The upper wall 16.2" of the inner compartment is provided with a gas escape port 34 about the outer periphery of which is mounted an exterior annular plug or washer 36. Flanges 16.3" extend downwardly from the top wall of the inner compartment and form with that wall and the associated side wall trapped gas spaces 16.4" to render the inner compartment buoyant in the liquid to be pumped.

The top wall 12.2" of the outer compartment is provided with a port 38, and an annular seal or washer 40 is mounted to the inner surface of the wall 12.2" about the periphery of the port 38 so as to come into contact with and seal against the confronting top wall of the inner compartment when the latter is in its upper position. A branched tube 42 extends upwardly from the port 38, and provides an upwardly extending gas escape line 42.1 (e.g., open to the atmosphere), and a liquid inlet tube 42.2 extending to the side.

In operation, with the inner compartment in its lower position, gas enters the inner compartment through the tube 30 and escapes from the pump through the ports 34, 38. Liquid enters the pump through the port 38 and flows downwardly in the space 18". As the liquid level rises in the inner compartment and in the space 18", the inner compartment is floated to its upper position wherein the plugs 36, 40 make sealing contact with the opposed compartment walls, thereby plugging the ports 38 and 34 and preventing further liquid or gas flow through these ports. The gas which continues to flow into the inner compartment through the tube 30 displaces the liquid therein and forces or pumps the same outwardly through the liquid outlet port 12.8". When the liquid level has fallen to the lower edge of the inner compartment, gas then bubbles up within the space 18 between the compartments to displace liquid within that space. As the liquid level in the space 18" falls, the buoyancy of the inner compartment is reduced until the same drops of its own weight into the lower position shown in FIG. 4, and the process is then repeated.

Speaking broadly, the interior of the outer compartment of pumps of the invention is preferably free from obstructions preventing the free movement of the inner compartment between its upper and lower positions. Although the inner and outer compartments have been described with references to parallelepiped configurations, it will be evident that various other configurations, such as cylindrical configurations, may be employed as well. The walls of the inner compartment, particularly the side walls thereof, may be made of fairly thin material so as to occupy little volume. The walls of the outer compartment are made of material sufficiently strong to withstand the pressures involved in the pumping cycle. In one embodiment, desirably used in an aquarium, the walls of the inner and outer compartments are made of a transparent plastic material, thereby permitting an observer to watch with amusement the operation of the pump. For industrial uses, the walls of the containers may be made of stainless steel, glass-clad steel or the like as is well known in the art. The plugs (e.g., 16.6, 16.7 in FIG. 1), which together with the associated ports define valve means, may be made of resilient material such as rubber or the like, or, depending upon the materials of construction employed for the compartments, may be formed integrally with the compartments such as when compartments are made of glass, plastic or steel. It will be understood, of course, that the inner compartment may be provided with other means to render the compartment buoyant in the liquid to be pumped. For example, with reference to the use of the pump of FIG. 1 in an aquarium, the inner compartment may be provided with sections of cork or plastic beads or the like. The buoyant nature of the inner compartment need only be such as to cause the compartment to rise gently to its upper position when it is submerged in the liquid to be pumped. As gas replaces liquid in that compartment during the pumping cycle, of course, buoyancy is increased.

Although the invention has been described above in terms of examples employing gas inlet ports (e.g., shown at 12.5 in FIG. 1), other means may be employed to provide a source of gas under pressure to the inner compartment. For example, a portion of the liquid may be vaporized, as by a heater such as that shown in phantom lines as 50 in FIG. 4; this method of furnishing gas under pressure being particularly applicable when the liquid to be pumped is a low-boiling refrigerant. The gas which escapes from the device (through port 42.1 in FIG. 4, for example) may be directed back into a reservoir of the liquid for re-liquification. It is contemplated that the gas pressure thus developed in the inner compartment will be controllable through control of the temperature of the liquid in accordance with known pressure-temperature-volume relationships. The configuration of the valve means may be modified considerably from those shown in the drawing, and it will be understood that the embodiments described in relation to the drawing figures are merely exemplary of various pumps falling within the scope of the invention.

Thus, manifestly, I have provided a gas-operated liquid pump which is simple in structure, which avoids the necessity of complicated mechanical valving, and which has an interior substantially completely available for fluid occupancy and flow. Pressure drops within the confines of the pump are negligable, and the use of heavy materials of construction for the inner compartment is largely avoided. The inner compartment both serves as a float and as a liquid pumping reservoir.

While I have described a preferred embodiment of the present invention, it should be understood that various changes, adaptations and modifications may be made therein without departing from the spirit of the invention and the scope of the appended claims.

What is claimed is:

1. A gas-operated pump for pumping a liquid comprising an outer compartment; an inner compartment vertically moveable between upper and lower positions in the outer compartment and having positive buoyancy in the liquid to be pumped and having a gas exhaust port disposed therethrough; inlet and exhaust porting means for permitting entry and discharge of gas and liquid to and from the pump; and valve means operable, when the inner compartment is in its upper position, to restrain loss of gas from the inner compartment through the gas exhaust port while simultaneously allowing gas to enter said inner compartment through said gas exhaust port causing displacement of liquid therefrom to thereby pump the liquid out through said exhaust porting means, and further permitting gas to escape through said gas exhaust port from said inner compartment when the latter is in its lower position.

2. The pump of claim 1 wherein said valve means includes a gas escape port provided in an upper portion of the inner compartment to permit gas to escape from the inner compartment, and seal means for sealing said gas escape port when the inner compartment is in its upper position.

3. The pump of claim 1 wherein said inner and outer compartments have confronting upper surfaces, and wherein said valve means includes a gas escape port provided in the upper surface of the inner container and seal means provided between the confronting upper walls of the containers and adapted to be contacted and sealed by the wall of the outer compartment when the inner compartment is in its upper position.

4. The pump of claim 1 wherein the inner and outer containers include confronting side walls defining between them a space available for liquid occupancy, liquid in said space serving to buoy the inner compartment upwardly into its upper position and further serving as a lubricant between said confronting compartment side walls to minimize any friction therebetween.

5. The pump of claim 4 including means communicating said space with the interior of the inner compartment to permit liquid in the space to be displaced with gas to thereby reduce the buoyancy of the inner compartment and to permit the latter to fall to its lower position.

6. A gas-operated pump for pumping a liquid comprising an outer compartment, an inner compartment vertically freely moveable between upper and lower positions in the outer compartment and having positive buoyancy in the liquid to be pumped, the inner compartment having side walls spaced inwardly from side walls of the outer compartment to define a space therebetween in communication with the interior of the inner compartment, the outer and inner compartments having confronting upper portions and the inner compartment having a gas escape port in its upper portion, and seal means provided between the confronting upper portions of the compartment for sealing the gas escape port when the inner compartment is in its upper position, and means permitting entry and discharge of gas and liquid to and from the pump.

7. A gas-operated pump for pumping a liquid, comprising:
(a) an outer compartment having a first gas port disposed therethrough;
(b) an inner compartment having a second gas port and a first liquid port disposed therethrough, said inner compartment being movable between upper and lower positions inside said outer compartment and having positive buoyancy in the liquid to be pumped;
(c) inlet and exhaust porting means for permitting the exhaust of gas and the inlet and exhaust of liquid to and from the pump; and
(d) valve means for:
 (i) allowing gas to enter said inner compartment through said first and second gas ports to cause displacement of the liquid from said inner compartment through said first liquid port to thereby pump the liquid through said exhaust porting means, when the inner compartment is in the upper position; and
 (ii) allowing gas to exhaust from said inner compartment through said second gas port to thereby allow liquid to enter said inner compartment through said first liquid port, when the inner compartment is in the lower position.

* * * * *